Patented Oct. 11, 1938

2,132,997

UNITED STATES PATENT OFFICE 2,132,997

PREPARATION OF METALLIC SOAPS

Walter W. Plechner, Plainfield, N. J., assignor, by mesne assignments, to National Lead Company, New York, N. Y., a corporation of New Jersey No Drawing. Application May 18, 1936, Serial No. 80,417

16 Claims. (Cl. 260—414)

The present invention relates to metallic soaps of certain metals and to novel methods for their preparation.

An object of my present invention is improved methods for preparing useful metallic soaps of certain polyvalent metals classified in subgroup A of the fourth group of the periodic system. This object, and others, will become apparent from the description of my invention.

Prior to my invention, two general methods for the manufacture of metallic soaps were known and practiced. (1) The so-called precipitation method wherein a solution of an alkali metal or ammonium soap was brought into contact with a solution of a metallic salt. The resulting double decomposition reaction precipitated the insoluble metallic soap. (2) The so-called fusion method wherein free fatty acids or resin acids or other high molecular weight fatty acids are heated with a suitable metallic compound, preferably the oxide, hydroxide, etc.

In the course of my researches on titanium, I discovered that the metals classified in sub-group A of the fourth group of the periodic system do not readily form metallic soaps by either of the two known methods. Continuing my researches I discovered novel methods, herein set forth, for preparing soaps of these metals.

Briefly summarized, my invention comprises reacting a halide of the metals of subgroup A of the fourth group of the periodic system with a high molecular weight organic acid at moderately elevated temperatures to form a soap of the metal employed and to eliminate hydrogen halide. Thus, somewhat differently expressed, the invention comprises bringing together a halide of the metals of subgroup A of the fourth group of the periodic system and a high molecular weight organic acid under conditions of temperature at which a soap of the said metal is formed and hydrogen halide eliminated by volatilization.

The metals of sub-group A of the fourth group of the periodic system include titanium, zirconium, cerium, hafnium and thorium. Titanium and cerium may in its compounds be either tri- or tetravalent and while the formation of the soaps of the trivalent modifications lies within the scope of my invention, I prefer to employ these elements in tetravalent form due to the greater usefulness of the resulting soaps, as will be later explained. I have prepared soaps of all these metals, employing the methods of the present invention, with the exception of hafnium, the halides of which I have been unable to obtain. However, the similar properties of hafnium and the other members of this group furnish justification for the presumption that the methods of my invention are general for all members of the group.

As halides of these metals, the fluorides, chlorides, bromides and iodides, preferably the tetra halides, are useful in the practice of my invention. As in other field of chemistry, I have found that the reactivity of the halide compounds to form metallic soaps decreases with increasing molecular weight of the halogen. The fluorides are most reactive but due to the extremely dangerous nature of hydrogen fluoride the use of these compounds presents certain difficulties in the proper disposal of this gas. The iodides tend to react somewhat more slowly and are not practical from a commercial point of view. By far the most suitable compounds, from the standpoint of high, but controllable, reactivity, availability and cost, are the chlorides, for example, the tetrachlorides.

The general method of the present invention is to bring slowly into contact with each other and with vigorous stirring, the metallic halide and the monobasic acid keeping the temperature moderately elevated. If a solid organic acid is employed the temperature of the reaction should be somewhat above the melting point of the acid. While the temperature may be varied depending upon the reactivity of metallic halide and the organic acid it is generally desirable to keep the temperature below 150° C. The resulting reaction may be expressed generally:

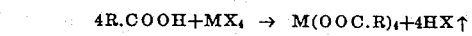

or more specifically:

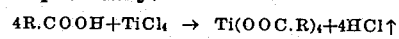

Where R is an organic radical, M, a metal of subgroup A of the fourth group of the periodic system and X a halogen.

In order better to control the reaction and to heat more evenly the reaction mixture, I have found that it is advantageous to carry out the reaction in the presence of a diluent. Such a diluent may be a solid, such as calcium carbonate, sand, clay, etc., or it may be an organic liquid such as aniline and other organic amines, toluene, benzol and the like. Either solid or liquid diluent may be completely inert to the action of hydrogen halide or it may be capable of reacting with the hydrogen halide formed, thus removing it from the sphere of reaction. Furthermore, a liquid diluent may be selected which is a solvent for the organic acid. In this case, the reaction will take place between the metallic halide and the solution of the organic acid. When employing a diluent in the practice of my invention the diluent must be removed in order to obtain the solid metal soap. If the diluent is an organic liquid, it may be removed by evaporation or distillation, preferably at reduced pressure. If a solid diluent is used, the reaction product may be taken up in an organic solvent, such as acetone, benzene, etc., filtered, and the organic solvent removed from the filtrate as by evaporation or distillation, preferably at reduced pressure.

I have further found that if the soaps prepared according to the method just described are subjected to a treatment with a low molecular weight aliphatic alcohol, there is obtained a metallic soap having a higher metallic content. Thus, if a soap containing, say 6.0 percent of titanium, is triturated or suspended in warm ethyl alcohol, a product may be obtained, under proper conditions, in which there will be present about 12 percent of titanium. This result does not appear to be due to the elimination of free organic acid but rather to a decomposition of the primary product similar to hydrolysis in an aqueous system, with the formation of a basic soap. The soaps so produced will have a metal content higher than indicated by the formula of the normal soap $X(OOC.R)_n$ where $X$ is a metal of subgroup A of the fourth group of the periodic system and $(OOC.R)$ an organic acid radical. Whatever be the explanation of the phenomenon, the facts are as stated, and one feature of my invention is the treatment of a metallic soap formed according to other features of the invention with a low molecular weight aliphatic monohydric alcohol to increase the metallic content of the soaps. The low molecular weight aliphatic alcohols which function in this manner include methyl to amyl alcohols.

Having described my invention the following examples are offered for illustrative purposes and no undue limitations are to be taken as to quantities, reaction conditions, etc.:

*Example No. 1.—Titanium stearate*

Five hundred grams triple-pressed stearic acid are heated to 70° C. and 100 grams finely divided calcium carbonate suspended in the melt. Eighty-five grams of anhydrous titanium tetrachloride are added in small portions with vigorous stirring. The reaction mass is heated on a bath with stirring, until the liberation of hydrogen chloride has ceased. To remove undesired solids, e. g., in this case calcium carbonate and any calcium chloride, titanium oxide or titanium oxychlorides formed, the melt may be filtered while hot, or it may be cooled, dissolved in an appropriate solvent such as ether or benzol and the solution clarified by centrifuging or filtering. If the latter method is used, the solvent may be evaporated and recovered by known means. The titanium stearate so prepared will analyze about 6.5 percent of titanium oxide corresponding to the formula $Ti(C_{18}H_{35}O_2)_4$. If the basic stearate, containing about 13 percent of titanium oxide, is desired, it may be precipitated by the addition of alcohol to a solution of the normal compound, and recovered by filtration.

*Example No. 2.—Zirconium stearate*

To 100 grams of molten stearic acid are added 20.4 grams of powdered tetrachloride and the reaction mixture is heated at 110° C. until the evolution of hydrogen chloride ceases. The zirconium stearate so prepared will contain 10 to 11 percent of zirconium oxide.

*Example No. 3.—Titanium linoleate*

Ninety grams of calcium carbonate were suspended in 500 grams of linseed fatty acids (mixed fatty acids derived from linseed oil) and 85 grams of titanium tetrachloride were added in small amounts with vigorous stirring. An additional 25 grams of calcium carbonate was added after all the titanium tetrachloride had been introduced into the fatty acids and the whole heated on a water-bath until evolution of hydrogen chloride had ceased and all of that gas had been driven off, as determined by freedom from odor of hydrogen chloride. The reaction mixture was dissolved in ether and filtered. The ether was then evaporated, leaving a dark brown, gel-like titanium linoleate (a titanium soap of the mixed fatty acids of linseed oil) containing 6.4 percent of titanium dioxide. When this material was treated, i. e., stirred with ethyl alcohol, and air-dried, it was converted to a light brown powder which contained 11.6 percent titanium dioxide.

*Example No. 4.—Titanium resinate*

Five hundred grams of colophony were melted and in this were suspended 100 grams of calcium carbonate. While keeping the mixture just molten over a low Bunsen flame, 85 grams of titanium tetrachloride were added in small portions with vigorous stirring. When the titanium tetrachloride had all been introduced into the reaction mixture and the evolution of hydrogen chloride had ceased, the mass was allowed to cool and taken up in ether and filtered. The ether was distilled off. The residual titanium resinate (a titanium soap of the acids contained in the colophony, principally abietic acid) contained 6 percent titanium dioxide. This material when suspended in ethyl alcohol, filtered and air-dried was converted to a light brown powder containing 10.9 percent titanium dioxide.

Soaps prepared according to the methods of the present invention, when subjected to an X-ray examination, do not show the presence of crystalline or amorphous metallic oxides which indicates the formation of a compound of the metal and the organic acid or acids.

It will be seen that my present invention is not limited to the type of organic soap formed. It is equally adapted to form metallic soaps of aliphatic acids such as relatively pure stearic, oleic, linolinic, palmitic, etc., or the mixed fatty acids of drying oils. Rosin acid, e. g. abietic acid soaps may also be prepared according to my herein described method. I have also prepared the soaps of more complex organic acids such as the naphthenic acids.

Soaps prepared according to my invention are useful in the arts, for example, as driers in paints and the like, in waterproofing materials, as thickeners in oils and greases, as stabilizers for suspensions and emulsions, as wetting agents, etc. They are particularly useful as wetting or dispersing agents for titanium pigments. It is well known that the soaps of the trivalent elements, for example, aluminum stearate, are more effective than the soaps of divalent elements, which in turn are more effective than monovalent soaps, as dispersing agents for pigments or emulsifying agents for water-in-oil emulsions. Similarly, I have found that the soaps of the tetravalent elements are still more effective for this purpose. Also the drying effects of the cerium soaps are hardly inferior to the well known drying effects produced by lead soaps and may therefore be successfully used as a drier in any paint or varnish in which the absence of lead is desired. They are amorphous solids, soluble in most organic solvents, e. g., ether, benzol, mineral spirits, linseed oil, etc., but insoluble in alcohols and water. However, the solubility of these metal-organic salts tends to decrease with increasing atomic weight of the metallic radical.

The metallic soaps which contain a higher proportion of metal than would be present in the normal soap are equivalent in usefulness to the normal soap and possess similar properties. I regard such high metallic soaps as novel and desire to claim them as part of the present invention.

The foregoing detailed description has been given for clearness of understanding and no undue limitations should be deduced therefrom, but the appended claims should be construed as broadly as possible in view of the prior art.

I claim:

1. Method for the preparation of a metallic soap composition which comprises reacting under substantially anhydrous conditions a halide of a metal of subgroup A of the fourth group of the periodic system with a high molecular weight monobasic organic acid at moderately elevated temperatures, sufficient to form a soap of the said metal and to eliminate hydrogen halide by volatilization.

2. Method for the preparation of a metallic soap composition which comprises bringing together under substantially anhydrous conditions a halide of a metal of subgroup A of the fourth group of the periodic system with a high molecular weight monobasic organic acid and under conditions of moderately elevated temperature sufficient to form a soap of the said metal and to eliminate hydrogen halide by volatilization.

3. Method for the preparation of a metallic soap composition which comprises bringing together under substantially anhydrous conditions, with vigorous stirring, a halide of a metal of subgroup A of the fourth group of the periodic system with a solid high molecular weight monobasic organic acid at a moderately elevated temperature slightly above the melting point of the said organic acid and maintaining the stirring at this temperature until the hydrogen halide is eliminated by volatilization.

4. Method for the preparation of a metallic soap composition which comprises bringing together under substantially anhydrous conditions, with vigorous stirring, at a temperature not in excess of 150° C., a halide of a metal of subgroup A of the fourth group of the periodic system and a mixture of high molecular weight monobasic organic acids derived from a vegetable oil and maintaining the stirring at this temperature until the hydrogen halide is eliminated by volatilization.

5. Method for the preparation of a metallic soap composition which comprises bringing together under substantially anhydrous conditions, with vigorous stirring, a halide of a metal of subgroup A of the fourth group of the periodic system and a high molecular weight monobasic organic acid and under conditions of moderately elevated temperature sufficient to form a soap of the said metal in the presence of a diluent.

6. Method for the preparation of a metallic soap composition having a content of metal chemically combined with the acid radical of a high molecular weight monobasic organic acid higher than indicated by the formula of the normal soap, $X(OOC.R)n$ where $X$ is a metal of subgroup A of the fourth group of the periodic system and $(OOC.R)$ is an organic acid radical which comprises bringing together under substantially anhydrous conditions, with vigorous stirring, a halide of a metal of subgroup A of the fourth group of the periodic system and a high molecular weight monobasic organic acid and under conditions of moderately elevated temperature sufficient to form a soap of the said metal and subsequently treating the metallic soap so produced with a low molecular weight aliphatic alcohol.

7. Method of making a titanium soap which comprises bringing together under substantially anhydrous conditions, with vigorous stirring, titanium tetrachloride and a high molecular weight monobasic organic acid at a temperature not in excess of 150° C. and maintaining the stirring at this temperature until the hydrogen chloride is eliminated by volatilization.

8. Method of making a titanium soap which comprises bringing together under substantially anhydrous conditions, with vigorous stirring, titanium tetrachloride and a high molecular weight monobasic organic acid at a temperature not in excess of 150° C. and in the presence of a diluent.

9. Method of making a titanium soap having a higher content of metal than indicated by the formula of the normal soap $Ti(OOC.R)_4$ where $(OOC.R)$ is an organic acid radical which comprises bringing together under substantially anhydrous conditions, with vigorous stirring, titanium tetrachloride and a high molecular weight monobasic organic acid at a temperature not in excess of 150° C., maintaining the stirring at this temperature until the hydrogen chloride is eliminated by volatilization and subsequently triturating the titanium soap thus produced with a low molecular weight aliphatic alcohol.

10. In a method of preparing a metallic soap composition by means of a reaction carried out at a moderately elevated temperature under substantially anhydrous conditions between a halide of a metal of subgroup A of the fourth group of the periodic system and a high molecular weight monobasic organic acid, the step which consists in carrying out the said reaction in the presence of a diluent.

11. In a method of preparing a metallic soap composition by means of a reaction carried out at a moderately elevated temperature under substantially anhydrous conditions between a halide of a metal of subgroup A of the fourth group of a periodic system and a high molecular weight monobasic organic acid, the step which consists in carrying out the said reaction in the presence of an organic liquid diluent which is a solvent for the said organic acid.

12. In a method of preparing a metallic soap composition by means of a reaction carried out at a moderately elevated temperature under substantially anhydrous conditions between a halide of a metal of subgroup A of the fourth group of the periodic system and a high molecular weight monobasic organic acid, the step which consists in carrying out the said reaction in the presence of a diluent which is capable of combining with the hydrogen halide formed.

13. In a method of preparing a metallic soap composition having metal content higher than indicated by the formula of the normal soap X.(OOC.R)n where X is a metal and (OOC.R) an organic acid radical by means of a reaction carried out at a moderately elevated temperature under substantially anhydrous conditions in the presence of a diluent which is capable of combining with the hydrogen halide formed, the step which consists in treating the normal soap of a metal of subgroup A of the fourth group of the periodic system with a low molecular weight aliphatic alcohol.

14. Method of making a cerium soap which comprises bringing together under substantially anhydrous condition, with vigorous stirring, cerium chloride and a high molecular weight monobasic organic acid at a temperature not in excess of 150° C. and maintaining the stirring at this temperature until the hydrogen chloride is eliminated by volatilization.

15. Method of making a zirconium soap which comprises bringing together under substantially anhydrous conditions, with vigorous stirring, zirconium chloride and a high molecular weight monobasic organic acid at a temperature not in excess of 150° C. and maintaining the stirring at this temperature until the hydrogen chloride is eliminated by volatilization.

16. As a new composition of matter, a soap of a metal of subgroup A of the fourth group of the periodic system and a high molecular weight monobasic organic acid having a metal content chemically combined with the acid radical of a high molecular weight monobasic organic acid higher than indicated by the formula of the normal soap, X.(OOC.R)n, where X is a metal of subgroup A of the fourth group of the periodic system and (OOC.R) a high molecular weight monobasic organic acid.

WALTER W. PLECHNER.